United States Patent
McGhee et al.

(10) Patent No.: US 10,063,474 B2
(45) Date of Patent: Aug. 28, 2018

(54) PARALLEL MATCH PROCESSING OF NETWORK PACKETS TO IDENTIFY PACKET DATA FOR MASKING OR OTHER ACTIONS

(71) Applicant: IXIA, Calabasas, CA (US)

(72) Inventors: David W. McGhee, Austin, TX (US); Cary J. Wright, Austin, TX (US)

(73) Assignee: Keysight Technologies Singapore (Holdings) Pte Ltd, Singapore (SG)

( * ) Notice: Subject to any disclaimer, the term of this patent is extended or adjusted under 35 U.S.C. 154(b) by 223 days.

(21) Appl. No.: 14/868,611

(22) Filed: Sep. 29, 2015

(65) Prior Publication Data

US 2017/0093715 A1   Mar. 30, 2017

(51) Int. Cl.
H04L 12/741 (2013.01)
H04L 12/743 (2013.01)
H04L 29/06 (2006.01)
H04L 12/861 (2013.01)

(52) U.S. Cl.
CPC ........ *H04L 45/745* (2013.01); *H04L 45/7457* (2013.01); *H04L 49/90* (2013.01); *H04L 69/22* (2013.01)

(58) Field of Classification Search
None
See application file for complete search history.

(56) References Cited

U.S. PATENT DOCUMENTS

| | | |
|---|---|---|
| 5,745,744 A | 4/1998 | Bechade |
| 6,611,211 B2 | 8/2003 | Ramon et al. |
| 6,888,760 B2 | 5/2005 | LaBerge |
| 7,590,009 B2 | 9/2009 | Yoon |
| 7,596,553 B2 | 9/2009 | Meirovitz et al. |
| 8,208,494 B2 | 6/2012 | Leong |
| 8,341,104 B2 | 12/2012 | Manickam et al. |
| 8,386,676 B2 | 2/2013 | Bains |
| 2004/0174820 A1* | 9/2004 | Ricciulli ............ H04L 47/2441 370/245 |
| 2006/0294297 A1* | 12/2006 | Gupta ................... G11C 15/00 711/108 |
| 2007/0083684 A1 | 4/2007 | Ueda |
| 2012/0084464 A1 | 4/2012 | Cochinwala et al. |

* cited by examiner

*Primary Examiner* — Kent Krueger (57) ABSTRACT

Systems and methods are disclosed for parallel match processing of network packets to identify data for masking or other actions. In part, the disclosed embodiments receive packets and identify packet data, such as sensitive data, by rapid parallel matching of packet data being communicated in multi-byte wide data paths to match parameters in order to generate match vectors. The match vectors are then used to generate control vectors that are subsequently used by packet processing circuitry to perform desired actions for this packet data (e.g., mask data) and/or for related packets (e.g., drop packets). For example, data identified through the match processing can be masked, and control vectors can be mask control vectors applied to parallel multiplexers. In certain embodiments, the parallel data multiplexers are controlled by the mask control vectors to selectively output either original packet data or mask data that obscures original packet data.

24 Claims, 7 Drawing Sheets

PARALLEL MATCH PROCESSING OF NETWORK PACKETS TO IDENTIFY PACKET DATA FOR MASKING OR OTHER ACTIONS

TECHNICAL FIELD OF THE INVENTION

This invention relates to processing of network packets within network communication systems to identify match sequences and, more particularly, to identification and protection of sensitive data within such communication systems.

BACKGROUND

Packet-based data networks continue to grow in importance, and it is often desirable to process network traffic associated with these packet-based networks within packet processing devices. The payload data within network packets, however, can include sensitive data such as personal information or other data that is desired to be detected. Identifying particular data and/or protecting personal information can be important. For example, entities can be required to protect personal information, such as identification information and medical history information, within packet processing systems that handle this personal information. Information technology (IT) professionals who monitor secure packet data networks where confidential sensitive information is communicated are typically required to follow privacy rules for handling such confidential sensitive information, such HIPAA (Health Insurance Portability and Accountability Act) privacy rules, PCI (Payment Card Industry) privacy rules, and/or other privacy related laws or regulations.

Various data masking, trimming, and/or other actions have been used in the past to address these data security and privacy needs. In one prior solution, sensitive data within network packets is replaced at fixed data offsets within the packets based upon an assumption that all packets will follow a specific protocol such that sensitive data will be located in the same bit positions in all packets. Data at these fixed offsets within received packets is then removed or obscured with a pre-determined code or other non-sensitive data. However, as network packet communication systems have become more complex, a variety of different packet protocols, packet formats, and/or packet sizes are often used within any given network communication system. Fixed offset solutions fail within such complex packet communication systems as sensitive data is not limited to specific fixed locations with all network packets.

To address this wide variety in network packet types, another prior solution is to completely parse received packets based upon the various protocols, formats, and sizes being used within the communication network. For this complete parsing solution, the system parses the entire packet to determine the particular protocol, format, and/or size being used. Once this determination is made, assumptions are further made with respect to the location of sensitive data for that particular protocol/format/size, and the sensitive data is masked at that location. In many cases, however, this complete parsing solution cannot be achieved in real-time at high-speed network communication line rates (e.g., 10 Gigabits per second (Gbs) or above) due to the complexity and variety of the protocols being used within the network communication system.

Rather than parse each network packet, another solution attempts to search the payload of each packet using regular expressions to find characters or digits for later masking. A regular expression, as used herein, is a sequence of characters that define search pattern strings for use in pattern matching for purposes of find-and-replace operations. This approach is flexible as it allows for different character strings to be defined and searched; however, this approach also suffers from an inability to process network packets in real-time at high-speed network communication line rates (e.g., 10 Gigabits per second (Gbs) or above). For example, pattern matching of regular expressions is typically processed using state machines and/or byte order processing engines that are relative slow as compared to high-speed network communicate line rates for current packet network communication systems.

SUMMARY OF THE INVENTION

Systems and methods are disclosed for parallel match processing of network packets to identify data for masking or other actions. In part, the disclosed embodiments receive network packets from a packet network communication system and identify data within packet payloads by rapid parallel matching of packet data being communicated in multi-byte wide data paths within packet processing systems. As packet data is received and processed through these wide data paths, multiple bytes are compared in parallel to match parameters in order to generate multiple bit match vectors. The match vectors are then used to generate multiple bit control vectors that are subsequently used by packet processing circuitry to perform desired actions for this packet data (e.g., mask data) and/or for related network packets (e.g., drop packets). For example, one action can be masking of data identified through the match processing, and the control vectors can be mask control vectors that are applied to parallel data multiplexers to provide data masking. In certain embodiments, the parallel data multiplexers are controlled by the mask control vectors to selectively output either the original packet data or mask data that obscures the original packet data. The parallel processing thereby allows for high-speed data masking. As such, data within the data packets, such as sensitive personal identification data, can be masked at high-speed network communication line rates. Other features and variations can be implemented, if desired, and related systems and methods can be utilized, as well.

For one embodiment, a method to process network packets is disclosed including communicating with a network communication system to receive a network packet, receiving an N-bit segment of packet data as input packet data where the N-bit segment of packet data includes one of a plurality of N-bit segments of packet data for the network packet, comparing M sub-segments of the input packet data to match parameters using M different comparators to generate an M-bit match vector where each of the M different comparators provides a bit for the M-bit match vector, using the M-bit match vector to generate an M-bit control vector, selectively performing at least one action associated with the network packet based upon the M-bit control vector, and repeating the receiving, comparing, using, and selectively performing for each of the plurality of N-bit segments of packet data. In further embodiments, the M-bit control vector matches the M-bit match vector. In still further embodiments, the plurality of M different comparators include one or more TCAMs (ternary content addressable memories).

In another embodiment, the M-bit control vector is an M-bit mask control vector, and the selectively performing includes selectively masking the input packet data based upon the M-bit mask control vector to generate N-bit output packet data. In further embodiments, the selectively masking includes using the M-bit mask control vector to control each of the M different multiplexers to selectively output N/M-bit segments of input packet data or N/M-bit segments of mask data. In still further embodiments, the method includes storing each N-bit segment of packet data within a delay buffer and using the delay buffer to provide the N/M-bit segments of input packet data to each of the M different multiplexers. In other embodiments, the method also includes storing mask data within a buffer and using the buffer to provide the N/M-bit segments of mask data to each of the M different multiplexers. In additional embodiments, the match parameters include number characters, and the N-bit output packet data includes mask data for any number characters matched within the input packet data.

In another embodiment, the method includes filtering the M-bit match vector to identify if one or more match sequences exist for the M-bit match vector. In further embodiments, the method also includes adjusting data values within the M-bit match vector when a match sequence is identified for the M-bit match vector. In other embodiments, the method also includes using one or more prior match vectors stored within a cache along with the M-bit match vector to perform the filtering. In still further embodiments, the one or more match sequences include at least one of a minimum number of matches, a maximum number of matches, or a range of matches associated with the M-bit match vector.

In another embodiment, the method includes parsing packet data for the network packet, generating a payload mask for each N-bit segment of packet data based upon the parsing, and adjusting the M-bit match vector for each N-bit segment of packet data based upon the payload mask. In still further embodiments, the payload mask includes M bits, and the method further includes using each of the M bits of the payload mask to determine whether one bit of the M-bit match vector is adjusted or is not adjusted.

For one embodiment, a packet processing system is disclosed including a packet data buffer and a plurality of M different comparators. The packet data buffer is configured to store at least one N-bit segment of packet data as input packet data where the N-bit segment of packet data is associated with a plurality of N-bit segments of packet data for a network packet from a network communication system. The plurality of M different comparators are coupled to the packet data buffer and configured to compare M sub-segments of the input packet data to match parameters and to output an M-bit match vector, and each of the M different comparators provides a bit for the M-bit match vector. The packet data buffer and the plurality of M different comparators are also configured to process each of the plurality of N-bit segments of packet data. In further embodiments, the M-bit control vector is configured to match the M-bit match vector. In still further embodiments, the plurality of M different comparators include one or more TCAMs (ternary content addressable memories).

In another embodiment, the M-bit control vector is an M-bit mask control vector; the system further includes a plurality of M different multiplexers configured to receive the M-bit match vector and to selectively mask the input packet data based upon an M-bit mask control vector to generate N-bit output packet data; and the M-bit mask control vector is based upon the M-bit match vector; where the packet data buffer, the plurality of M different comparators, and the plurality of M different multiplexers are configured to process each of the plurality of N-bit segments of packet data. In further embodiments, each of the plurality of M different multiplexers is configured to selectively output an N/M-bit segment of the input packet data or an N/M bit segment of mask data for one of the M sub-segments of the input packet data based upon the M-bit mask control vector. In still further embodiments, the system also includes a delay buffer configured to store the input packet data, and each of the M different multiplexer is coupled to receive the N/M-bit segment of input packet data from the delay buffer. In other embodiments, the system also includes a buffer configured to store mask data and wherein each of the M different multiplexer is coupled to receive the N/M bit segment of mask data from the buffer. In additional embodiments, the match parameters include number characters, and the N-bit output packet data is configured to include mask data for any number characters matched within the input packet data.

In another embodiment, the system also includes a match filter configured to identify if one or more match sequences exist for the M-bit match vector. In further embodiments, the match filter is configured to adjust data values within the M-bit match vector if a match sequence is identified within the M-bit match vector. In still further embodiments, the system also includes a cache configured to store one or more match vectors, and the match filter is further configured to use the one or more stored match vectors to identify if one or more match sequences exist for the M-bit match vector. In additional embodiments, the one or more match sequences comprises at least one of a minimum number of matches, a maximum number of matches, or a range of matches within the M-bit match vector. In further embodiments, the system also includes a packet parser configured to receive and parse packet data for the network packet and to generate a payload mask based upon the parsed packet data, and wherein the match filter is further configured to adjust the M-bit match vector based upon the payload mask. In still further embodiments, the payload mask comprises M bits, and the match filter is configured to use each of the M bits of the payload mask to determine whether one bit of the M-bit match vector is adjusted or is not adjusted.

Different or additional features, variations, and embodiments can be implemented, if desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Systems and methods are disclosed to identify data within network packets for masking or other actions. In part, the disclosed embodiments receive network packets from a packet network communication system and identify data within packet payloads using a parallel data processing engine that provides rapid parallel matching of packet data being communicated in multi-byte wide data paths within packet processing systems. As packet data is received and processed through wide data paths, multiple bytes are compared in parallel to match parameters in order to generate match vectors. The match vectors are then used to generate control vectors that are subsequently used by packet processing circuitry to perform desired actions for this packet data (e.g., mask data) and/or for related network packets (e.g., drop packets). For example, one action can be masking of data identified through the match processing, and the control vectors can be mask control vectors that are applied to parallel data multiplexers to provide data masking. In certain embodiments, the parallel data multiplexers are controlled by the mask control vectors to selectively output either the original packet data or mask data that obscures the original packet data. The parallel processing thereby allows for high-speed data masking. As such, data within the data packets, such as sensitive personal identification data, can be masked at high-speed network communication line rates (e.g., 10 Gigabits per second (Gbs) or above). Different features and variations can be implemented, as desired, and related systems and methods can be utilized, as well.

For certain disclosed embodiments, the match parameters correspond to number characters within packet payload data that are masked as sensitive information. For example, account numbers, social security numbers, personal identification numbers (PINs), and/or other sensitive numerical data is masked by identifying and obscuring binary values representing number characters within the packet data. The disclosed embodiments are particularly useful for data masking solutions with respect to network packet data processed using FPGAs (field programmable gate arrays) and/or other configurable logic devices (CLDs) that use wide parallel buses to process data. For example, the disclosed embodiments can be used to mask data within FPGAs that are processing 10 Gbs packet data using 64-bit wide data busses (e.g., eight 8-bit data bytes) operating at a rate of 156.25 MHz while still keeping up with a 10 Gbs line rate for the packet network communication system. For such FPGA embodiments, each clock cycle can be used to process a different N-bit (e.g., 64-bit) data segments. While masking numerical data is described for the embodiments below, other types of sensitive data (e.g., names, passwords, location, and/or other sensitive data) can also be matched and masked using the data masking techniques described herein. Other variations can also be implemented for the disclosed embodiments, as desired.

Figure 1:
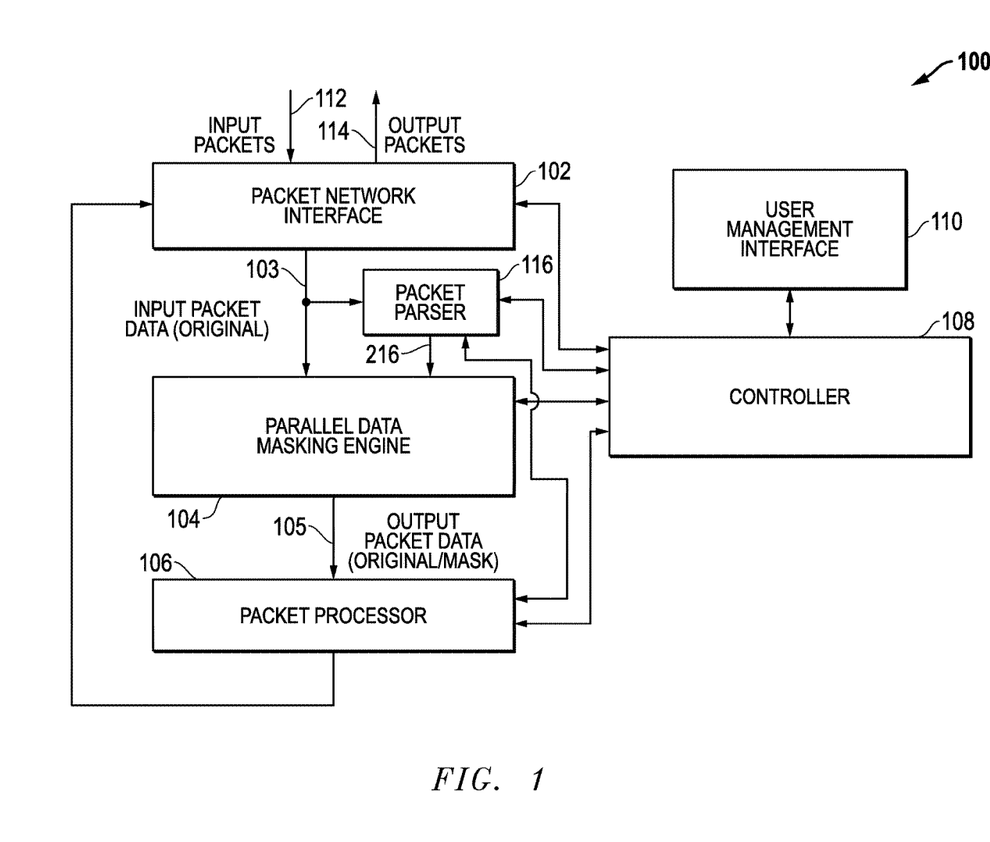
FIG. 1 is a block diagram of an example embodiment for a packet processing system including a parallel data masking engine that processes input packet data using N-bit wide segments.

FIG. 1 is a block diagram of an example embodiment 100 for a packet processing system including a parallel data masking engine 104. For the example embodiment 100, the packet network interface 102 is configured to receive input packets 112 from a packet network communication system and to generate N-bit wide segments of input packet data 103 associated with the input packets 112. For example, the packet network interface 102 can store received network packets within a packet buffer and then output N-bit wide segments of packet data from this packet buffer as input packet data 103. As such, the input packet data 103 from the packet network interface 102 includes in part the original payload data for the input packets 112, and the input packet data 103 is provided to the parallel data masking engine 104. A packet parser 116 can also be provided that is configured to receive and parse the input packet data 103 to determine information about the received input packets 112, such as identifying headers, encapsulation labels, payload data, and/or other information about the input packets 112. The parser 116 can also generate a payload mask 216 that is communicated to the parallel data masking engine 104, as described further below. It is also noted that the packet network interface 102 can include a serializer/deserializer (SerDes) that receives the input packets 112 as serialized single-bit data and outputs parallel N-bit wide segments of packet data for the input packet data 103. The packet network interface 102 can also include a physical coding sublayer (PCS) and a MAC (media access control) sublayer that operate to align incoming data into byte/word boundaries and also to determine packet boundaries from these data bytes/words.

As described in more detail below, the parallel data masking engine 104 receives N-bit wide segments of input packet data 103 and rapidly compares these N-bit wide data segments of input packet data 103 in parallel to match parameters in order to generate match vectors. These match vectors are in turned used to generate mask control vectors that are applied to parallel data multiplexers to pass either the original data or mask data that obscures the original data. As such, the output packet data 105 output by the parallel data masking engine 104 includes original data and/or mask data depending upon the results of the match comparisons. The packet processor 106 receives and further processes the output packet data 105 which now can include mask data that obscures data within the original input packet data 103. For example, the packet processor 106 can operate to forward packet data to the packet network interface 102 that is then output as output packets 114 to one or more destination devices based upon forwarding rules defined within the packet processing system 100. The packet processing system 100 can also include a controller 108 that is coupled to communicate control signals or messages with the packet network interface 102, the parallel data masking engine 104, the packet parser 116, and the packet processor 106. The controller 108 can also be coupled to a user management interface 110, such as a graphical user interface, that allows external users to configure, adjust, and/or manage the operations of the packet processing system 100 through the controller 108.

Figure 2:
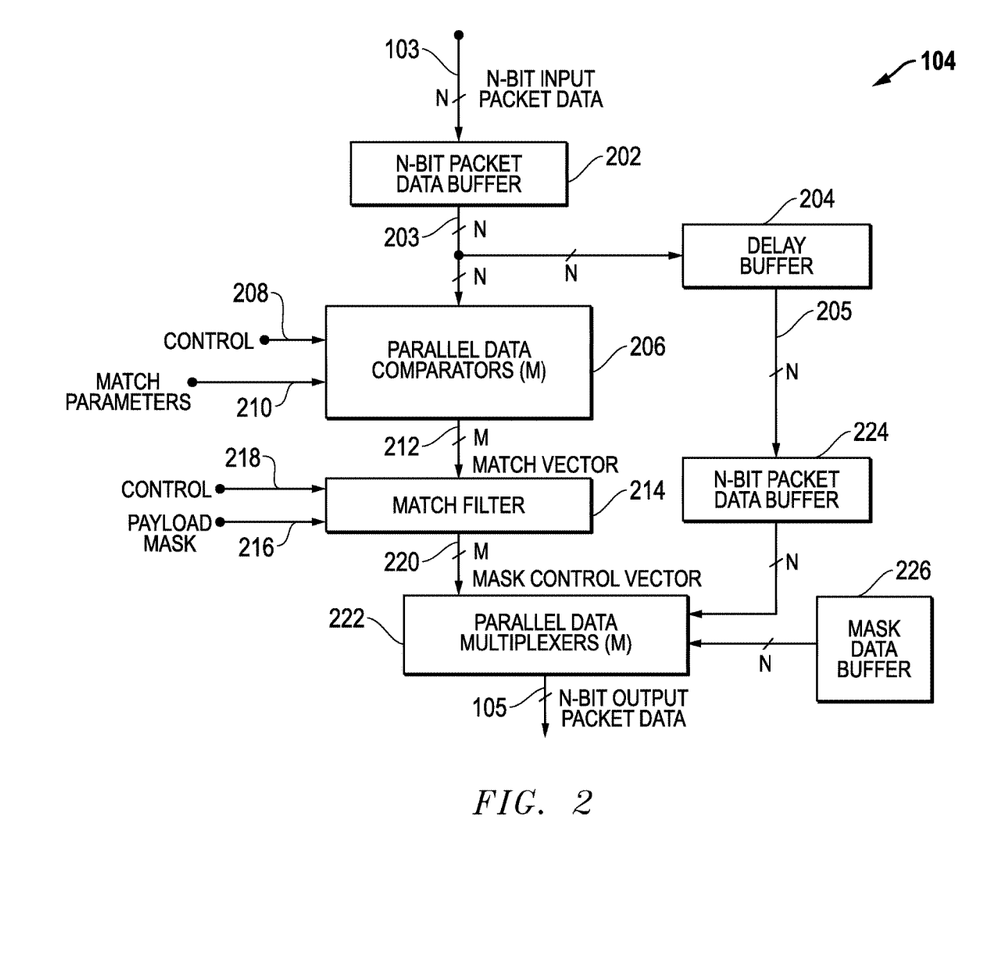
FIG. 2 is a block diagram of an example embodiment for a parallel data masking engine.

FIG. 2 is block diagram of an example embodiment for the parallel data masking engine 104. For the example embodiment of FIG. 2, it is assumed that the input packet data 103 and the output packet data 105 is N-bit data that is communicated through N-bit wide data buses. As indicated above, the input packet data 103 can be received from a packet network interface 102 and can be based upon the input packets 112 received from a network communication system. Once received, the N-bit input packet data 103 is provided to buffer 202 which in turn provides this data as N-bit packet data 203 to a delay buffer 204 and to parallel data comparators 206. Delay buffer 204 in turn outputs N-bit data 205 to the packet data buffer 224 after a delay that compensates for the processing time within parallel data comparators 206 and the match filter 214. As such, the output of the match filter 214 is aligned with the data within the N-bit packet data buffer 224.

Figure 3:
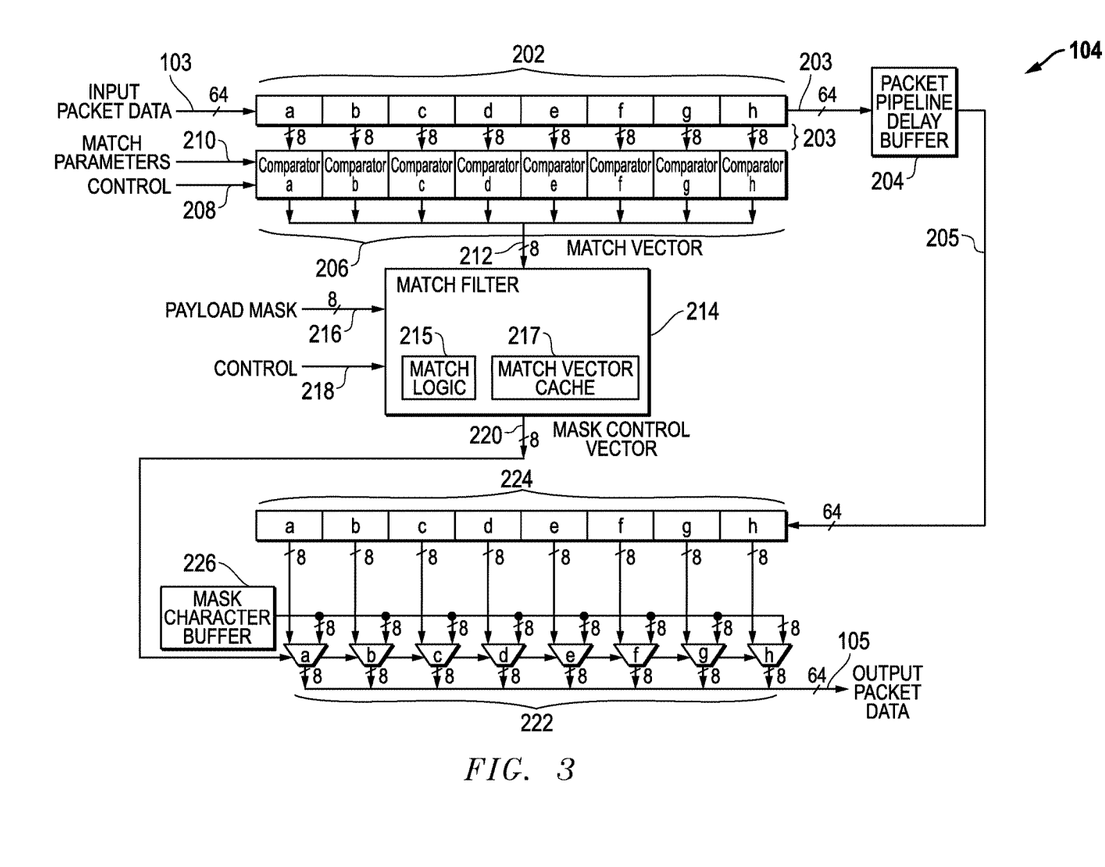
FIG. 3 is a block diagram of an example embodiment for the parallel data masking engine where 64-bit wide data paths are used.

The parallel data comparators 206 provide rapid comparison of the N-bit packet data 203 to match parameters 210. As described in more detail below with respect to FIG. 3A, parallel data comparators 206 include M different comparators, and each of the M different comparators processes N/M-bit sub-segments of the N-bit data 203. Comparators 206 also receive control signals 208, and these control signals 208 as well as the match parameters 210 can be provided, for example, from the controller 108. Based upon the comparison of the N/M-bit segments of N-bit data 203 to the match parameters 210, the comparators 206 output a match vector 212 that includes M bits with one bit being provided by each of the M different comparators 206. The match filter 214 receives the match vector 212 and outputs a mask control vector 220 that also includes M bits.

The match filter 214 also receives a payload mask 216 from the packet parser 116 to indicate which portions of the packet are eligible for masking and can also receive additional control signals 218, for example, from the controller 108. The match filter 214 uses the payload mask 216, if applied, to adjust the match vector 212 based upon bits within the payload mask 216. The parallel data multiplexers 222 then receive the mask control vector 220 and use bits within the mask control vector 220 as control signals to selectively output original packet data held in packet data buffer 224 or mask data held in data buffer 226. As described in more detail below, the output packet data 105 is N-bit data output by the parallel data multiplexers 222, and output packet data 105 selectively includes original data and/or mask data based upon the bits within the mask control vector 220.

FIG. 3 is a block diagram of an example embodiment for the parallel data masking engine 104 where 64-bit wide data paths are used. For this example embodiment, the packet data buffer 202 is a 64-bit buffer with eight (8) different 8-bit sub-registers (e.g., sub-registers a, b, c, d, e, f, g, h), and the input packet data 103 is received as 64-bit wide data segments. The parallel data comparators 206 include eight (8) comparators (e.g., comparators, a, b, c, d, e, f, g, h), and each of the different comparators 206 receives an 8-bit output from a corresponding sub-register within the packet data buffer 202. As described herein, a match filter 214 can be used to modify the match vector 212 to generate the mask control vector 220, or the match filter 214 can simply pass the match vector 212 through without modification as the mask control vector 220. The match vector 212 and the mask control vector 220 are each 8-bit values. The packet data buffer 224 is a 64-bit buffer with eight (8) different 8-bit sub-registers (e.g., sub-registers a, b, c, d, e, f, g, h) and receives packet data 205 from the packet pipeline delay buffer 204 which in turn receives data 203 from the packet data buffer 202. The parallel multiplexers 222 include eight (8) multiplexers (e.g., multiplexers a, b, c, d, e, f, g, h). Each of the different multiplexers 222 receives an 8-bit output from a corresponding sub-register within the packet data buffer 224 along with 8-bit outputs from the mask character buffer 226. The multiplexers 222 also receive the mask control vector 220 as control signals. The output packet data 105 is output as 64-bit wide data segments with 8 bits being provided by each of eight (8) multiplexers. As such, input packet data 103 from incoming network packets 112 are processed in 64-bit segments by the parallel data masking engine 104.

In operation, each of the different comparators 206 receives match parameters 210 and packet data 203 from packet data buffer 202 in addition to control signals or messages 208. For each of the different comparators 206, if the 8-bit data received by the comparator matches the match parameters 210, then that comparator will generate an output at a first logic level. If there is no match, then the comparator will generate an output at a second logic level. In certain embodiments, a high logic level (e.g., logic "1") indicates the presence of a match, and a low logic level (e.g., logic "0") indicates the lack of a match. The outputs from each of the different comparators 206 are then combined to form an 8-bit match vector 212 that is provided to the match filter 214.

The match filter 214 receives the 8-bit match vector 212 and an 8-bit payload mask 216 in addition to control signals or messages 218. The match filter 214 uses bits within the 8-bit payload mask 216, if applied, to determine if one or more of the bits within the match vector 212 should be masked prior to output as the mask control vector 220, which is also an 8-bit value. For example, if any of the bits with the payload mask 216 are a first logic level (e.g., logic "1"), then the corresponding bit within the match vector 212 is forced to indicate that no match was found (e.g., forced to logic "0") regardless of whether a match was found for the corresponding sub-segment. Further, as described in more detail below, the match filter 214 can also be configured to include match logic 215 that defines one or more match sequences that are desired to be detected with the match vector 212. The match filter 214 uses the match logic 215 to determine if particular match sequences exist for the match vector 212 and then to modify the mask control vector 220 based upon that determination. Further, a match vector cache 217 can be used to store one or more match vectors 212 from prior cycles to allow for detection of match sequences that can possibly overlap 64-bit data segment boundaries. After applying the payload mask 216 and/or the match logic 215, the match filter 214 outputs a mask control vector 220. It is again noted that the mask control vector 220 can be the same as the match vector 212, for example, if no modifications are made to the match data within the match vector 212 by the match filter 214 or if the match filter 214 is bypassed or removed.

Each of the parallel multiplexers 222 receives one bit from the 8-bit mask control vector 220 as a control input signal that determines whether that multiplexer outputs 8-bits of original packet data from the packet data buffer 224 or outputs 8-bits of mask data from the mask character buffer 226. For example, one logic level for the bits of the mask control vector 220 will cause the original packet data from the packet data buffer 224 to be output, and an opposite logic level for the bits of the mask control vector 220 will cause the mask data from the mask character buffer 226 to be output. In certain embodiments, a high logic level (e.g., logic "1") selects the mask data, and a low logic level (e.g., logic "0") selects the original packet data. The 8-bit outputs from the eight (8) parallel multiplexers 222 are then combined to provide the 64-bit output packet data 105 for the parallel data masking engine 104.

It is noted that the payload mask 216 can be used, for example, to mask or prevent data matches for certain types of packet data. For example, the payload mask 216 can be used to mask or prevent data matches when packet header information, such as IP (Internet Protocol) or MAC (Media Access Control) addresses, is being processed by the parallel data masking engine 104. As indicated above, the payload mask 216 can be generated by the packet parser 116 based upon the contents of the original input packet data 103 and a determination by the packet parser 116 about which portions of the packet are appropriate or eligible for application of data masking. As further indicated above, additional control signals or messages 208 and 218 can be provided from the controller 108 and can be used to configure the operation of the parallel data masking engine 104. Further, the match parameters 210 can also be provided by the controller 108.

As one additional example for the operation of the parallel data masking engine 104 within FIG. 3, it is assumed that it is desired for the parallel data masking engine 104 to mask ASCII (American Standard Code for Information Interchange) values representing the number characters "0" to "9" and the dash character "-" with mask data set to be the number sign character "#". For this example, the parallel data comparators 206 can be implemented using a TCAM (ternary content addressable memory) or multiple TCAMs that are configured to indicate a match when a number or dash character is detected, and these characters are then be replaced with the mask data. For this example, it is further assumed that the match filter 214 is not used, is bypassed, or is otherwise configured to pass the match vector 212 without modification as the mask control vector 220. Assuming now that the input packet data 103 contains a series of 8-bit ASCII data values in 64-bit segments for the characters: "123-45-6789," the TCAMs will assert a logic "1" into the match vector 212 for each 8-bit byte sub-segment because every byte representing the string will match a number character or a dash character. The match filter 214, which is not actively used for this example, then passes this match vector 212 (e.g., "11111111") to the multiplexers 222 as the mask control vector 220. The multiplexers 222 then selectively output 8-bit binary representations of the number sign character as the mask data from the mask character buffer 226. As such, the output packet data 105 from the parallel data masking engine 104 includes only the binary representations of the characters "############" rather than the input data string of "123-45-6789".

The following TABLE 1 provides example data values for this example. For TABLE 1, it is assumed that the ASCII characters above are being received and corresponding ASCII hexadecimal values for these ASCII characters are included in TABLE 1. The designation "x" in TABLE 1 represents "don't care" values for the final ASCII character in the third 64-bit data segment.

data character "#" is represented by hexadecimal "23" in the ASCII standard which in turn corresponds to "00100011" in a binary value. The dash character "-" is represented by hexadecimal "2D" in the ASCII standard which in turn corresponds to "00101101" in binary value. For number characters "0" to "9", the ASCII representations range from "30" hexadecimal to "39" hexadecimal. As such, it is noted that the number character "4" is represented by hexadecimal "34" in the ASCII standard which in turn corresponds to "001101000" in a binary value. Thus, each of the number characters "0" to "9", the dash character "-", and the number sign character "#" can all be represented by 8-bit binary values that correspond to ASCII hexadecimal values. It is further noted that the binary values for the ASCII hexadecimal values for the number and dash characters can be searched and matched using one or more TCAMs, as indicated above. Matching data can then be masked using mask data such as the binary value for the ASCII number sign character. Other variations could be implemented as desired.

As described above, the match filter 214 can be configured to provide more complex match sequence processing with respect to the match vector 212. For example, by increasing the complexity of the match filter 214 and match logic 215, match sequence patterns can be extended to match a minimum number of matches, a range of matches (e.g., equal to or more than a minimum number of matches but equal to or less than a maximum number of matches), an exact number of matches, and/or other variations. For example, a minimal match of four matches can be implemented as a series of four-input AND gates arranged such that a bit of the mask control vector 220 is true when any 8-bit sub-segment (e.g., sub-segments a, b, c, d, e, f, g, h in FIG. 3) is part of any run of four or more matches. It is also noted that a range of matches can be implemented by ANDing runs of minimum length or more with the ones complement of runs of maximum length plus one or more. It is further noted that an exact match can be implemented as a range where the minimum and maximum runs are set to the same value. Further, as indicated above, match vectors 212 from prior cycles can be stored within a match vector cache 217 so that the match filter 214 and match logic 215 can identify patterns that overlap segment boundaries. For example, a previous match vector and a next match vector can be analyzed along with each current match vector being analyzed to identifying such overlapping match sequences. Variations can also be implemented, as desired, based upon the match sequences desired to be detected within the match vectors being processed and/or stored in cache.

TABLE 2 below provides example input/output data embodiments for operation of a match filter 214, match logic

TABLE 1

EXAMPLE ASCII VALUES FOR 64-BIT SEGMENTS

| 64-bit Segment | Input ASCII Characters | Input ASCII Hexadecimal Values | Output ASCII Characters | Output ASCII Hexadecimal Values |
|---|---|---|---|---|
| 1 | 123-45-6 | 3132332D34352D36 | ######## | 2323232323232323 |
| 2 | 789xxxxx | 373839xxxxxxxxxx | ###xxxxx | 232323xxxxxxxxxx |

With respect to TABLE 1, it is noted that hexadecimal values are base 16 values from 0 to 15 that are represented textually by the numbers 0-9 followed by the letters A-F and that are represented by 4-bit digit binary values from 0000 (number 0) to 1111 (letter F). For example above, the mask 215, and a match vector cache 217 where different match sequences are being detected. For these examples, it is assumed that previous/next match vectors before and after the current match vector are all logic "0" (e.g., "00000000" for 8-bit match vectors) and are stored in cache 217.

TABLE 2

EXAMPLE MATCH SEQUENCES

| Current Match Vector 212 | Match Sequence Logic 215 | Mask Control Vector 220 |
|---|---|---|
| 10110111 | Minimum runs of 1 | 10110111 |
| 10110111 | Minimum runs of 2 | 00110111 |
| 10110111 | Minimum runs of 3 | 00000111 |
| 10110111 | Minimum runs of 4 | 00000000 |
| 10110111 | Range of 1 to 2 | 10110000 |

For TABLE 2 above, the locations within the current match vector 212 that satisfy the match sequence logic 215 are underlined. For this example, the corresponding bit with the match control vector 220 will be a "1" for each of these underlined locations and will be a "0" for the non-underlined locations. Also for this example, when a bit of the mask control vector 220 is a "1," the corresponding multiplexer within parallel multiplexers 222 will output mask data from the mask data buffer 226. Instead, if a bit of the mask control vector 220 is a "0," the corresponding multiplexer within parallel multiplexers 222 will output original data from packet data buffer 224.

Figure 4:
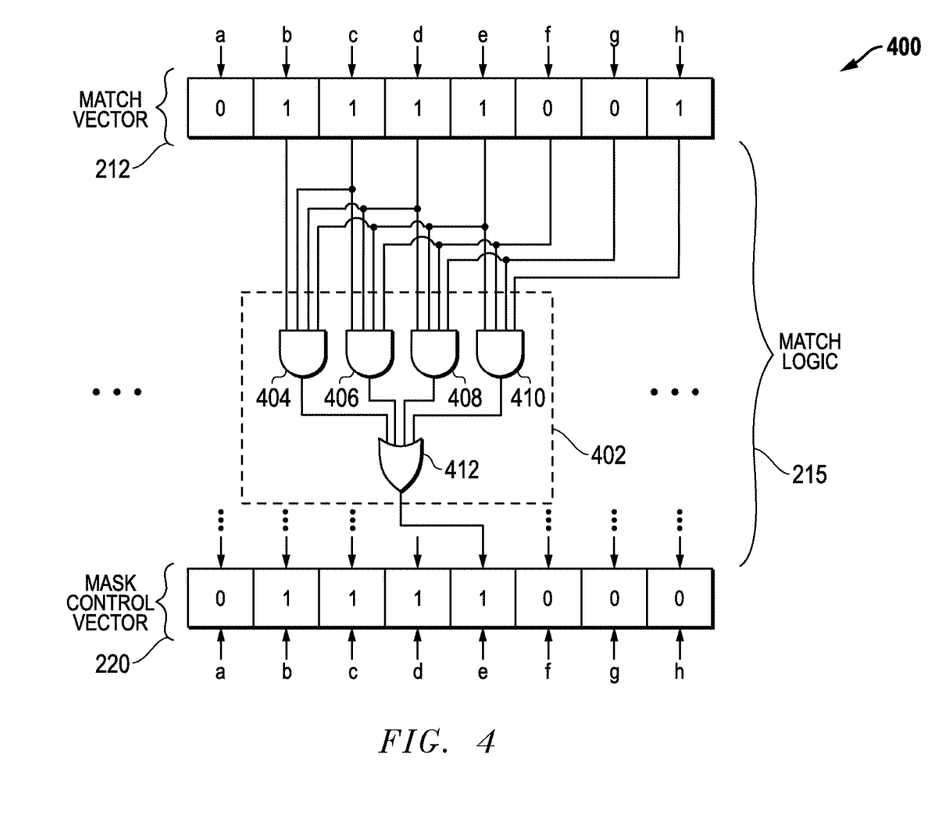
FIG. 4 is a block diagram of an example embodiment including match logic that detects a minimum run of at least four matches in a row within the match vector.

FIG. 4 is a block diagram of an example embodiment 400 including match logic 215 that detects a minimum run of at least four matches in a row within the match vector 212. For the embodiment depicted and similar to FIG. 3 above, the match vector 212 includes eight (8) different bit locations (e.g., a, b, c, d, e, f, g, h). The resulting mask control vector 220 also includes eight (8) different bit locations (e.g., a, b, c, d, e, f, g, h) that correspond to bit locations within the match vector 212. The match logic 215 includes logic that detects the minimum runs of at least four matches in a row. While only example logic 402 for bit location "e" is shown, it is understood that similar logic would be included within match logic 215 for each of the other bit locations "a, b, c, d" and "f, g, h." It is also noted that bit values within previous and next match vectors, for example as stored in a match vector cache 217, would be used for inputs to corresponding logic for bit locations "a, b, c" and "f, g, h" within each current match vector 212 being analyzed, as four-in-a-row matches could overlap the N-bit data segments.

Looking to logic 402, four AND gates 404, 406, 408, and 410 are included that each provide an output to OR gate 412. In particular, AND gate 404 receives the four bit values from bit locations "b, c, d, e" and outputs a "1" to the OR gate 412 only if all four are a logic "1." If not, then AND gate 404 provides a "0" to OR gate 412. AND gate 406 receives the four bit values from bit locations "c, d, e, f" and outputs a "1" to the OR gate 412 only if all four are a logic "1." If not, then AND gate 406 provides a "0" to OR gate 412. AND gate 408 receives the four bit values from bit locations "d, e, f, g" and outputs a "1" to the OR gate 412 only if all four are a logic "1." If not, AND gate 408 provides a "0" to OR gate 412. AND gate 410 receives the four bit values from bit locations "e, f, g, h" and outputs a "1" to the OR gate 412 only if all four are a logic "1." If not, AND gate 410 provides a "0" to OR gate 412. As shown, the four AND gates 404, 406, 408, and 410 each provide an output to the input of OR gate 412. The OR gate 412 will output a "1" to the bit location "e" in the mask control vector 220 if any of the inputs from AND gates 404, 406, 408, or 410 is a "1." If not, a "0" is output by OR gate 412 to the bit location "e" in the mask control vector 220.

With respect to the particular bit values shown in in FIG. 4, it is again assumed that previous/next match vectors before and after the current match vector 212 are all logic "0" (e.g., "00000000" for 8-bit match vectors). Bit location "a" and bit locations "f, g" in the mask control vector 220 are a "0" as their corresponding bit locations in the match vector 212 are "0" and therefore cannot be part of a run of four matches (i.e., four "1" values in a row). Bit location "h" in the mask control vector 220 is a "0" because although the corresponding bit location in the match vector 212 is a "1," it is still is not part of a run of four matches (i.e., four "1" values in a row) as the previous/next match vectors are all logic "0" and bit locations "f, g" are also a logic "0." Bit locations "b, c, d, e" in the mask control vector 220 are each a "1" as each of the corresponding bit locations in the match vector 212 is part of a run of four matches. For this embodiment 400, therefore, the input match vector 212 has bit values "01111001" and leads to a mask control vector 220 having bit values "01111000." As with the example for TABLE 2 above, when a bit of the mask control vector 220 is a "1" for this example embodiment 400, the corresponding multiplexer within parallel multiplexers 222 will output mask data from the mask data buffer 226. Instead, if a bit of the mask control vector 220 is a "0," the corresponding multiplexer within parallel multiplexers 222 will output mask data from the mask data buffer 226.

Figure 5:
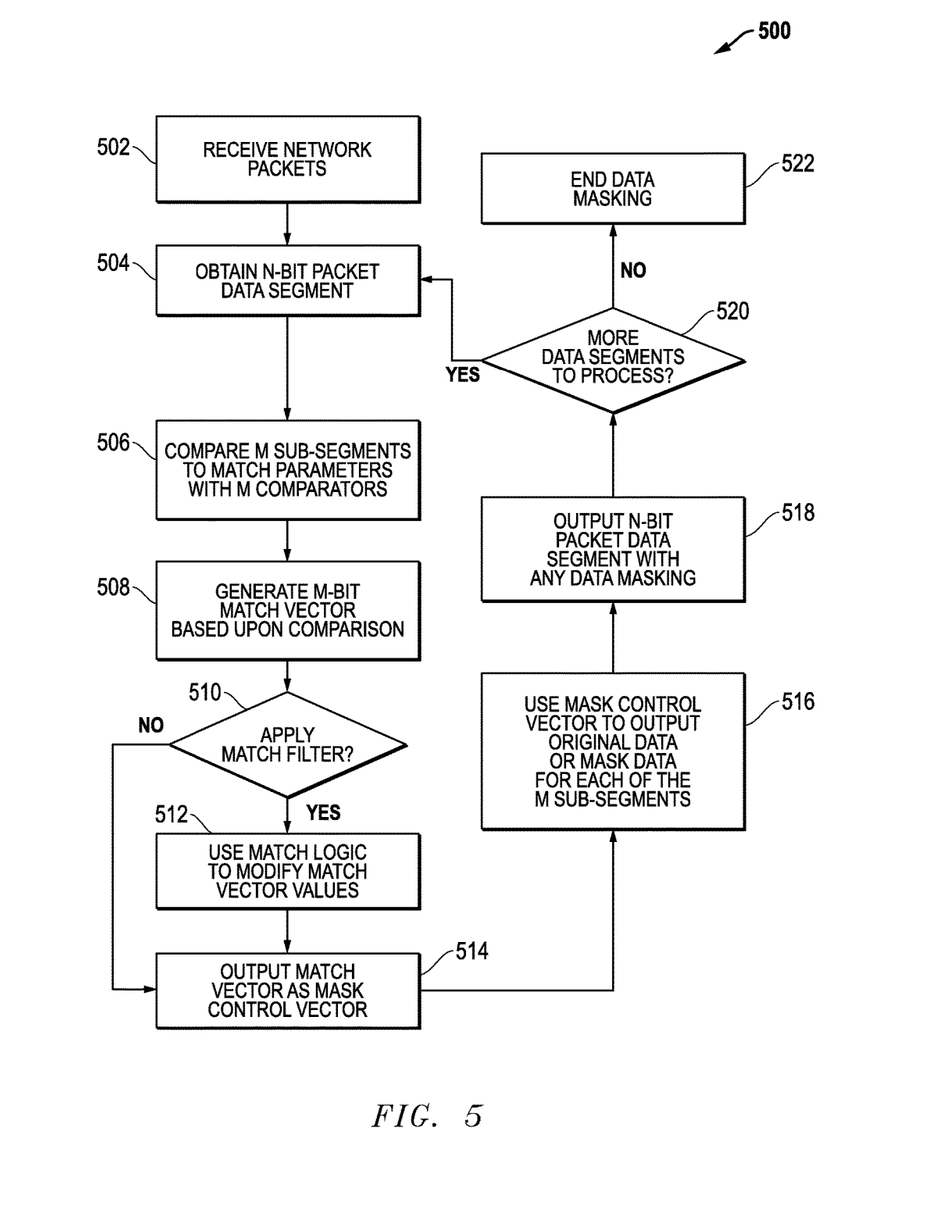
FIG. 5 is a process flow diagram of an example embodiment to mask data within packet data for packet network communication systems.

FIG. 5 is a process flow diagram of an example embodiment 500 to mask data within packet data for packet network communication systems. In block 502, network packets are received. In block 504, an N-bit segment 203 (e.g., 64-bit segment) for packet data associated with the received packets is obtained, for example, from a packet buffer 202. In block 506, M sub-segments (e.g., 8 sub-segments) of the N-bit packet data 203 are compared to match parameters 210 using M comparators 206. In block 508, an M-bit match vector 212 (e.g., 8-bit match vector) is generated based upon the comparison to match parameters 210. In block 510, a determination is made whether or not to apply a match filter 214. If "NO," then flow passes to block 514. If "YES," then flow first passes to block 512 where match logic 215 is used to modify match vector values based upon one or more detected match sequences. In block 514, the original or modified match vector is output as a mask control vector 220. In block 516, the mask control vector 220 is used to selectively output the original packet data or mask data for each of the M packet data sub-segments. In block 518, an N-bit packet data segment 105 is output with any data masking that was applied by block 516. In block 520, a determination is made whether there are more data segments to be processed. If "YES," then flow passes back to block 504. If "NO," then flow passes to block 522 where data masking ends. It is noted that different and/or additional process blocks could also be used while still taking advantage of the parallel data masking techniques described here.

Figure 6:
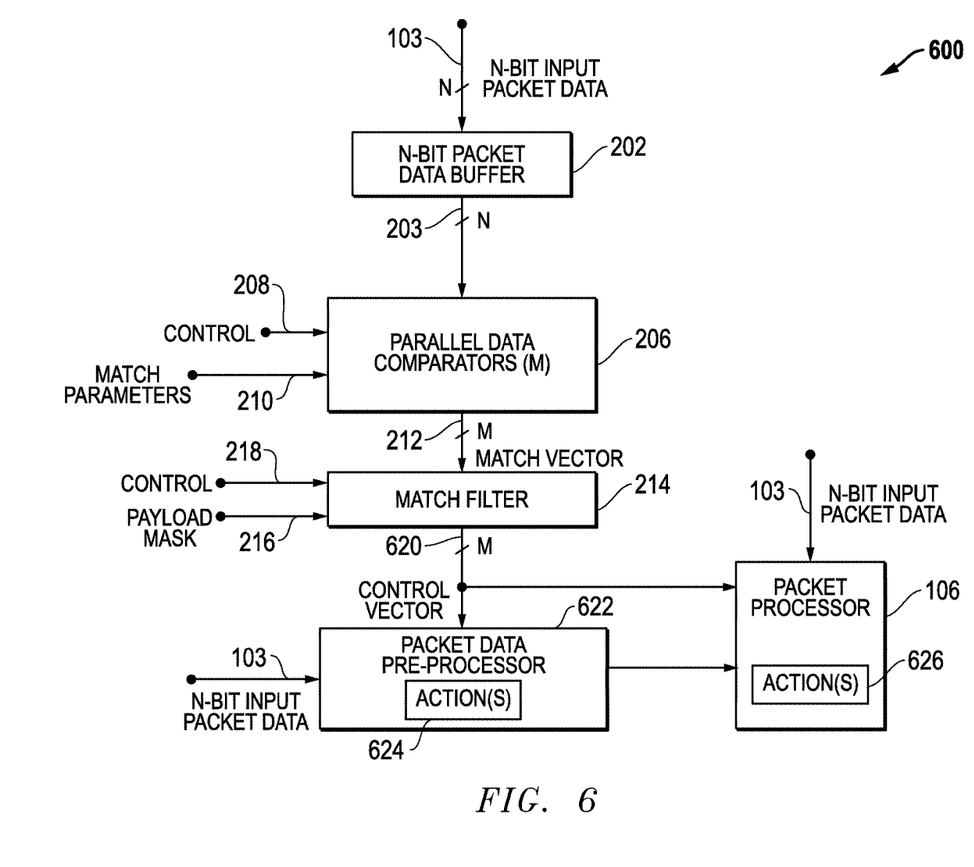
FIG. 6 is a block diagram of an example embodiment for parallel data matching of FIG. 2 where a control vector from the match filter is used more generally to determine actions to be applied to packet data by subsequent packet processing circuitry.
Figure 7:
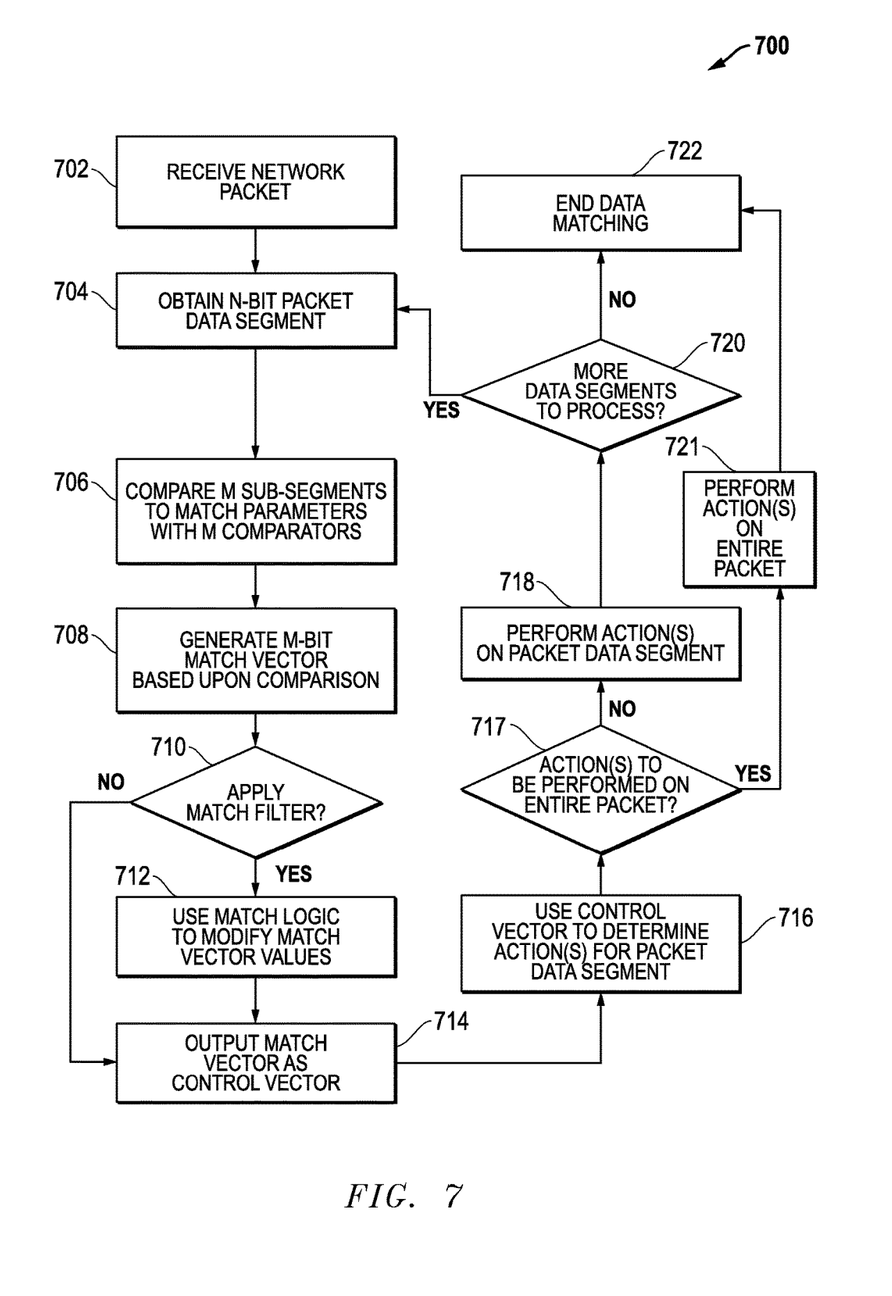
FIG. 7 is a process flow diagram of an example embodiment to identify and take action with respect to matched data within packet data for packet network communication systems.

As indicated above, while FIGS. 1-5 are directed to masking of data identified within network packets using the parallel match processing described herein, one or more different actions can also be applied to packet data and related network packets based upon this parallel match processing. FIGS. 6-7 provide example embodiments that more generally use match vectors to generate control vectors that are subsequently used by packet processing circuitry to perform desired actions for packet data and related network packets based upon the parallel match processing. While these actions can include masking of data, as described above, these actions can also include other actions such as discarding or dropping packets including matched data, forwarding packets including matched data to a particular destination, slicing a packet based upon matched data, marking a packet based upon matched data, counting packets including matched data, encrypting a packet including matched data, extracting and storing the matched data in a data storage system for later use or processing, and/or other desired action based upon the results of the parallel data matching process. As such, a wide variety of actions can be taken while still taking advantage of the parallel data matching techniques described here.

Looking now to FIG. 6, a block diagram is provided of an example embodiment 600 for parallel data matching of FIG. 2 where a control vector 620 from the match filter 214 is used more generally to determine actions for packet data. It is again assumed that the input packet data 103 is communicated through N-bit wide data buses. Once received, the N-bit input packet data 103 is provided to buffer 202 which in turn provides this data as N-bit packet data 203 to parallel data comparators 206. The parallel data comparators 206 provide rapid comparison of the N-bit packet data 203 to match parameters 210. As described above, parallel data comparators 206 include M different comparators, and each of the M different comparators processes N/M-bit sub-segments of the N-bit data 203. Comparators 206 also receive control signals 208, and these control signals 208 as well as the match parameters 210 can be provided, for example, from the controller 108. Based upon the comparison of the N/M-bit segments of N-bit data 203 to the match parameters 210, the comparators 206 output a match vector 212 that includes M bits with one bit being provided by each of the M different comparators 206. The match filter 214 receives the match vector 212 and outputs a control vector 620 that also includes M bits, and the match filter 214 includes match logic 215 and a match vector cache 217 as described above. As also described above, the match filter 214 can also receive a payload mask 216 from the packet parser 116 and can also receive additional control signals 218, for example, from the controller 108. As further described above, the match filter 214 uses the payload mask 216, if applied, to adjust the match vector 212 based upon bits within the payload mask 216 prior to its being output as control vector 620.

The control vector 620 in FIG. 6 is the same as mask control vector 220 in FIG. 2 except that the control vector 620 is applied to a packet data pre-processor 622 and/or to the packet processor 106 to cause actions 624 and/or actions 626 that are not limited to data masking. For the embodiment 600 depicted, the packet data pre-processor 622 receives the input packet data 103 and applies one or more actions 624 (e.g., data masking) to the packet data and/or to related packets, and one example embodiment for the packet data pre-processor 622 is the parallel data multiplexers 222 in FIG. 2. Similarly, the packet processor 106 receives the input packet data 103 and applies one or more actions 626 (e.g., dropping packets) to the packet data and/or related packets. While data masking and dropping packets can be actions taken based upon the control vector 620, other actions can also be taken. As described above, these actions 624/626 can include a variety of other actions including discarding or dropping packets including matched data, forwarding packets including matched data to a particular destination, slicing a packet based upon matched data, marking a packet based upon matched data, counting packets including matched data, encrypting a packet including matched data, extracting and storing the matched data in a data storage system for later use or processing, and/or other desired action based upon the results of the parallel data matching process. Other variations can also be implemented while still taking advantage of the parallel data masking techniques described here.

FIG. 7 is a process flow diagram of an example embodiment 700 to identify and take action with respect to matched data within packet data for packet network communication systems. In block 702, a network packet is received. In block 704, an N-bit segment 203 (e.g., 64-bit segment) for packet data associated with the received packet is obtained, for example, from a packet buffer 202. In block 706, M sub-segments (e.g., 8 sub-segments) of the N-bit packet data 203 are compared to match parameters 210 using M comparators 206. In block 708, an M-bit match vector 212 (e.g., 8-bit match vector) is generated based upon the comparison to match parameters 210. In block 710, a determination is made whether or not to apply a match filter 214. If "NO," then flow passes to block 714. If "YES," then flow first passes to block 712 where match logic 215 is used to modify match vector values based upon one or more detected match sequences. In block 714, the original or modified match vector is output as a control vector 620. In block 716, the control vector 620 is used to determine one or more actions with respect to the packet data segment. In block 717, a determination is made whether the one or more actions are to be performed on the entire packet. If "YES," then flow passes to block 721 where the one or more actions determined in block 716 based upon the control vector 620 are performed on the entire packet by packet processing circuitry. Block 722 is then reached where the data matching ends. If the determination in block 717 is "NO," then flow passes to block 718 wherein the one or more actions determined in block 716 based upon the control vector 620 are performed on the packet data segment by packet processing circuitry. In block 720, a determination is then made whether there are more data segments to be processed. If "YES," then flow passes back to block 704. If "NO," then flow passes to block 722 where data matching ends. It is noted that different and/or additional process blocks could also be used while still taking advantage of the parallel data masking techniques described here.

It is noted that the functional blocks, systems, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to process network packets, comprising:
communicating with a network communication system to receive a network packet;
receiving an N-bit segment of packet data as input packet data, the N-bit segment of packet data being one of a plurality of N-bit segments of packet data for the network packet;
comparing M different sub-segments of the input packet data to match parameters using a plurality of M different comparators to generate an M-bit match vector, each of the plurality of M different comparators having one of the M different sub-segments as an input, and each of the plurality of M different comparators providing a bit for the M-bit match vector;
using the M-bit match vector to generate an M-bit control vector;
selectively performing at least one action associated with the network packet based upon the Mbit control vector; and
repeating the receiving, comparing, using, and selectively performing for each of the plurality of N-bit segments of packet data;
wherein the M-bit control vector is an M-bit mask control vector, and wherein the selectively performing comprises selectively masking the input packet data based upon the M-bit mask control vector to generate N-bit output packet data;
wherein the selectively masking comprises using the M-bit mask control vector to control each of a plurality of M different multiplexers to selectively output N/M-bit segments of input packet data or N/M-bit segments of mask data; and
wherein the plurality of N-bit segments of packet data are received through multi-byte wide data paths and the N/M-bit segments are 8-bit segments.

2. The method of claim 1, wherein the M-bit control vector matches the M-bit match vector.

3. The method of claim 1, further comprising storing each N-bit segment of packet data within a delay buffer and using the delay buffer to provide the N/M-bit segments of input packet data to each of the plurality of M different multiplexers.

4. The method of claim 1, further comprising storing mask data within a buffer and using the buffer to provide the N/M-bit segments of mask data to each of the plurality of M different multiplexers.

5. The method of claim 1, wherein the match parameters comprise number characters, and wherein the N-bit output packet data includes mask data for any number characters matched within the input packet data.

6. The method of claim 1, further comprising filtering the M-bit match vector to identify if one or more match sequences exist for the M-bit match vector.

7. The method of claim 6, further comprising adjusting data values within the M-bit match vector when a match sequence is identified for the M-bit match vector.

8. The method of claim 6, further comprising using one or more prior match vectors stored within a cache along with the M-bit match vector to perform the filtering.

9. The method of claim 6, wherein the one or more match sequences comprises at least one of a minimum number of matches, a maximum number of matches, or a range of matches associated with the M-bit match vector.

10. The method of claim 1, further comprising parsing packet data for the network packet, generating a payload mask for each N-bit segment of packet data based upon the parsing, and adjusting the M-bit match vector for each N-bit segment of packet data based upon the payload mask.

11. The method of claim 9, wherein the payload mask comprises M bits, and further comprising using each of the M bits of the payload mask to determine whether one bit of the M-bit match vector is adjusted or is not adjusted.

12. The method of claim 1, wherein the plurality of M different comparators comprise one or more TCAMs (ternary content addressable memories).

13. A packet processing system, comprising:
a packet data buffer configured to store at least one N-bit segment of packet data as input packet data, the N-bit segment of packet data being associated with a plurality of N-bit segments of packet data for a network packet from a network communication system; and
a plurality of M different comparators coupled to the packet data buffer and configured to compare M different sub-segments of the input packet data to match parameters and to output an M-bit match vector, each of the plurality of M different comparators having one of the M different sub-segments as an input, and each of the plurality of M different comparators providing a bit for the M-bit match vector;
wherein the packet data buffer and the plurality of M different comparators are configured to process each of the plurality of N-bit segments of packet data;
wherein the M-bit match vector is used to generate an M-bit control vector;
wherein the M-bit control vector is an M-bit mask control vector, and further comprising:
a plurality of M different multiplexers configured to receive the M-bit match vector and to selectively mask the input packet data based upon an M-bit mask control vector to generate N-bit output packet data, the M-bit mask control vector being based upon the M-bit match vector;
wherein the packet data buffer, the plurality of M different comparators, and the plurality of M different multiplexers are configured to process each of the plurality of N-bit segments of packet data;
wherein each of the plurality of M different multiplexers is configured to selectively output an N/M-bit segment of the input packet data or an N/M bit segment of mask data for one of the M different sub-segments of the input packet data based upon the M-bit mask control vector; and
wherein the plurality of N-bit segments of packet data are received through multi-byte wide data paths and the N/M-bit segments are 8-bit segments.

14. The packet processing system of claim 13, wherein the M-bit control vector is configured to match the M-bit match vector.

15. The packet processing system of claim 13, further comprising a delay buffer configured to store the input packet data, and wherein each of the plurality of M different multiplexers is coupled to receive the N/M-bit segment of input packet data from the delay buffer.

16. The packet processing system of claim 13, further comprising a buffer configured to store mask data and wherein each of the plurality of M different multiplexers is coupled to receive the N/M bit segment of mask data from the buffer.

17. The packet processing system of claim 13, wherein the match parameters comprise number characters, and wherein the N-bit output packet data is configured to include mask data for any number characters matched within the input packet data.

18. The packet processing system of claim 13, further comprising a match filter configured to identify if one or more match sequences exist for the M-bit match vector.

19. The packet processing system of claim 18, wherein the match filter is configured to adjust data values within the M-bit match vector if a match sequence is identified within the M-bit match vector.

20. The packet processing system of claim 18, further comprising a cache configured to store one or more match vectors, and wherein the match filter is further configured to use the one or more stored match vectors to identify if one or more match sequences exist for the M-bit match vector.

21. The packet processing system of claim 18, wherein the one or more match sequences comprises at least one of a minimum number of matches, a maximum number of matches, or a range of matches within the M-bit match vector.

22. The packet processing system of claim 13, further comprising a packet parser configured to receive and parse packet data for the network packet and to generate a payload mask based upon the parsed packet data, and wherein the match filter is further configured to adjust the M-bit match vector based upon the payload mask.

23. The packet processing system of claim 22, wherein the payload mask comprises M bits, and wherein the match filter is configured to use each of the M bits of the payload mask to determine whether one bit of the M-bit match vector is adjusted or is not adjusted.

24. The packet processing system of claim 13, wherein the plurality of M different comparators comprise one or more TCAMs (ternary content addressable memories).

* * * * *

UNITED STATES PATENT AND TRADEMARK OFFICE
CERTIFICATE OF CORRECTION

Page 1 of 1

PATENT NO. : 10,063,474 B2
APPLICATION NO. : 14/868611
DATED : August 28, 2018
INVENTOR(S) : David W. McGhee et al.

It is certified that error appears in the above-identified patent and that said Letters Patent is hereby corrected as shown below:

In the Claims

In Column 15, Line 35, in Claim 1, delete "Mbit" and insert -- M-bit --, therefor.

Signed and Sealed this
Twenty-fifth Day of December, 2018

Andrei Iancu
*Director of the United States Patent and Trademark Office*